(12) United States Patent
Oklejas, Jr.

(10) Patent No.: US 7,892,429 B2
(45) Date of Patent: Feb. 22, 2011

(54) BATCH-OPERATED REVERSE OSMOSIS SYSTEM WITH MANUAL ENERGIZATION

(75) Inventor: Eli Oklejas, Jr., Monroe, MI (US)

(73) Assignee: Fluid Equipment Development Company, LLC, Monroe, MI (US)

( * ) Notice: Subject to any disclaimer, the term of this patent is extended or adjusted under 35 U.S.C. 154(b) by 281 days.

(21) Appl. No.: 12/237,448

(22) Filed: Sep. 25, 2008

(65) Prior Publication Data

US 2009/0188865 A1     Jul. 30, 2009

Related U.S. Application Data

(60) Provisional application No. 61/023,948, filed on Jan. 28, 2008.

(51) Int. Cl.
| | |
|---|---|
| B01D 61/08 | (2006.01) |
| B01D 61/02 | (2006.01) |
| B01D 61/12 | (2006.01) |
| B01D 61/00 | (2006.01) |

(52) U.S. Cl. .................. 210/321.6; 210/637; 210/652; 210/137; 210/257.2; 417/387

(58) Field of Classification Search ........................ None
See application file for complete search history.

(56) References Cited

U.S. PATENT DOCUMENTS

| | | |
|---|---|---|
| 659,930 A | 10/1900 | Kemble |
| 893,127 A | 7/1908 | Barber |
| 1,022,683 A | 4/1912 | Kienast |
| 1,024,111 A | 4/1912 | Anderson |

(Continued)

FOREIGN PATENT DOCUMENTS

EP       1508361 A       2/2005

(Continued)

OTHER PUBLICATIONS

El-Sayed E et al.: "Performance evaluation of two RO membrane configurations in a MSF/RO hybrid system". Desalination, Elsevier, Amsterdam, NL, vol. 128, No. 3, May 1, 2000, pp. 231-245, XP004204830; ISSN: 0011-9164; p. 232-p. 234; figure 1.

(Continued)

*Primary Examiner*—Krishnan S Menon
(74) *Attorney, Agent, or Firm*—Harness, Dickey & Pierce, P.L.C.

(57) ABSTRACT

A batch reverse osmosis system in fluid communication with a fluid reservoir and a method that includes a housing having an inlet valve in fluid communication with the fluid reservoir. The system also includes a pressure vessel having an elongated liner, a membrane disposed within a second end of the liner and having a membrane inlet, a membrane outlet disposed at the second end and a permeate outlet. The system includes a recirculation piston disposed within the first end that defines a fluid volume between the recirculation piston and the membrane adjacent to the membrane inlet. The housing and a plunger disposed within the housing define a chamber. The plunger is coupled to an actuator. The system includes a hollow pipe with a port that is coupled to the actuator. The hollow pipe communicates fluid between the chamber within the housing and the fluid volume within the pressure vessel.

20 Claims, 5 Drawing Sheets

U.S. PATENT DOCUMENTS

| | | | |
|---|---|---|---|
| 1,066,581 A | 7/1913 | Brown | |
| 2,715,367 A | 8/1955 | Kodet et al. | |
| 2,748,714 A | 6/1956 | Henry | |
| 3,160,108 A | 12/1964 | Sence | |
| 3,563,618 A | 2/1971 | Ivanov | |
| 3,614,259 A | 10/1971 | Neff | |
| 3,664,758 A | 5/1972 | Sato | |
| 3,748,057 A | 7/1973 | Eskeli | |
| 3,828,610 A | 8/1974 | Swearingen | |
| 3,969,804 A | 7/1976 | Macinnes et al. | |
| 3,999,377 A | 12/1976 | Oklejas et al. | |
| 4,028,885 A | 6/1977 | Ganley et al. | |
| 4,029,431 A | 6/1977 | Bachl | |
| 4,070,280 A | 1/1978 | Bray | |
| 4,187,173 A | 2/1980 | Keefer | |
| 4,230,564 A | 10/1980 | Keefer | |
| 4,243,523 A | 1/1981 | Pelmulder | |
| 4,255,081 A | 3/1981 | Oklejas et al. | |
| 4,288,326 A | 9/1981 | Keefer | |
| 4,353,874 A | 10/1982 | Keller et al. | |
| 4,432,876 A | 2/1984 | Keefer | |
| 4,434,056 A | 2/1984 | Keefer | |
| 4,472,107 A | 9/1984 | Chang et al. | |
| RE32,144 E | 5/1986 | Keefer | |
| 4,632,756 A | 12/1986 | Coplan et al. | |
| 4,702,842 A | 10/1987 | Lapierre | |
| 4,830,572 A | 5/1989 | Oklejas, Jr. et al. | |
| 4,921,603 A | 5/1990 | Yen | |
| 4,966,708 A | 10/1990 | Oklejas et al. | |
| 4,973,408 A | 11/1990 | Keefer | |
| 4,983,305 A | 1/1991 | Oklejas et al. | |
| 4,997,357 A | 3/1991 | Eirich et al. | |
| 5,020,969 A | 6/1991 | Mase et al. | |
| 5,043,071 A | 8/1991 | Anselme et al. | |
| 5,049,045 A | 9/1991 | Oklejas et al. | |
| 5,082,428 A | 1/1992 | Oklejas et al. | |
| 5,106,262 A | 4/1992 | Oklejas et al. | |
| 5,132,015 A | 7/1992 | Down | |
| 5,132,090 A | 7/1992 | Volland | |
| 5,133,639 A | 7/1992 | Gay et al. | |
| 5,154,572 A | 10/1992 | Toyoshima et al. | |
| 5,320,755 A | 6/1994 | Hagqvist et al. | |
| 5,338,151 A | 8/1994 | Kemmner et al. | |
| 5,340,286 A | 8/1994 | Kanigowski | |
| 5,401,395 A | 3/1995 | Hagqvist et al. | |
| 5,482,441 A | 1/1996 | Permar | |
| 5,499,900 A | 3/1996 | Khmara et al. | |
| 5,647,973 A | 7/1997 | Desaulniers | |
| 5,702,229 A | 12/1997 | Moss et al. | |
| 5,819,524 A | 10/1998 | Bosley et al. | |
| 5,951,169 A | 9/1999 | Oklejas et al. | |
| 5,980,114 A | 11/1999 | Oklejas, Jr. | |
| 6,007,723 A | 12/1999 | Ikada et al. | |
| 6,017,200 A | 1/2000 | Childs et al. | |
| 6,036,435 A | 3/2000 | Oklejas | |
| 6,110,360 A | 8/2000 | Hart, Jr. | |
| 6,110,375 A | 8/2000 | Bacchus et al. | |
| 6,116,851 A | 9/2000 | Oklejas, Jr. | |
| 6,120,689 A | 9/2000 | Tonelli et al. | |
| 6,139,740 A | 10/2000 | Oklejas | |
| 6,139,750 A * | 10/2000 | Graham | 210/652 |
| 6,187,200 B1 | 2/2001 | Yamamura et al. | |
| 6,190,556 B1 | 2/2001 | Uhlinger | |
| 6,299,766 B1 | 10/2001 | Permar | |
| 6,309,174 B1 | 10/2001 | Oklejas, Jr. et al. | |
| 6,345,961 B1 | 2/2002 | Oklejas, Jr. | |
| 6,375,842 B1 | 4/2002 | Graham | |
| 6,402,956 B1 | 6/2002 | Andou et al. | |
| 6,468,431 B1 | 10/2002 | Oklejas, Jr. | |
| 6,508,937 B1 | 1/2003 | Kawashima et al. | |
| 6,589,423 B1 | 7/2003 | Chancellor | |
| 6,709,599 B1 | 3/2004 | Rosenberger et al. | |
| 6,713,028 B1 | 3/2004 | Oklejas, Jr. | |
| 6,797,173 B1 | 9/2004 | Oklejas, Jr. | |
| 6,881,336 B2 | 4/2005 | Johnson | |
| 6,908,546 B2 | 6/2005 | Smith | |
| 6,932,907 B2 | 8/2005 | Haq et al. | |
| 6,936,140 B2 | 8/2005 | Paxton et al. | |
| 7,077,962 B2 | 7/2006 | Pipes | |
| 7,150,830 B1 | 12/2006 | Katsube et al. | |
| 2003/0080058 A1 | 5/2003 | Kimura et al. | |
| 2004/0104157 A1 | 6/2004 | Beeman et al. | |
| 2004/0211729 A1 | 10/2004 | Sunkara et al. | |
| 2006/0157409 A1 | 7/2006 | Hassan | |
| 2006/0157410 A1 | 7/2006 | Hassan | |
| 2006/0226077 A1 | 10/2006 | Stark | |
| 2006/0254981 A1 | 11/2006 | Efraty | |
| 2007/0023347 A1 | 2/2007 | Chabot | |
| 2007/0056907 A1 | 3/2007 | Gordon | |
| 2007/0199878 A1 | 8/2007 | Eisberg et al. | |
| 2007/0289904 A1 | 12/2007 | Oklejas | |
| 2007/0295650 A1 | 12/2007 | Yoneda et al. | |
| 2008/0023410 A1 | 1/2008 | Efraty | |
| 2008/0217222 A1 | 9/2008 | Efraty | |

FOREIGN PATENT DOCUMENTS

| | | |
|---|---|---|
| GB | 2363741 A | 1/2002 |
| WO | WO02/09855 A | 2/2002 |
| WO | WO2006/106158 A | 10/2006 |
| WO | WO2007/146321 A | 12/2007 |

OTHER PUBLICATIONS

Geisler P et al.: "Reduction of the energy demand for seawater RO with the pressure exchange system PES". Desalination, Elsevier, Amsterdam, NL, vol. 135, No. 1-3, Apr. 20, 2001, pp. 205-210, XP004249642; ISSN: 0011-9164; the whole document.

* cited by examiner

US 7,892,429 B2

BATCH-OPERATED REVERSE OSMOSIS SYSTEM WITH MANUAL ENERGIZATION

RELATED APPLICATION

This application is a non-provisional application of provisional application 60/023,948, filed Jan. 28, 2008, the disclosure of which is incorporated by reference herein.

TECHNICAL FIELD

The present disclosure relates generally to reverse osmosis systems, and, more specifically, to batch-operated reverse osmosis systems using manual energization.

BACKGROUND

The statements in this section merely provide background information related to the present disclosure and may not constitute prior art.

Reverse osmosis systems are used to provide fresh water from brackish or sea water. A membrane is used that restricts the flow of dissolved solids therethrough.

A reverse osmosis system involves pressurizing a solution with an applied pressure greater than an osmotic pressure created by the dissolve salts within the solution. The osmotic pressure is generally proportional to the concentration level of the salt. The approximate osmotic pressure in pounds-per-square-inch is the ratio of the salt mass to water mass times 14,000. A one-percent solution of salt would have an osmotic pressure of about 140 psi. Ocean water typically has a 3.5 percent concentration and an osmotic pressure of 490 psi.

Water extracted from a reverse osmosis system is called permeate. As a given body of saline solution is processed by the reverse osmosis membrane, the concentration of the solution is increased. At some point, it is no longer practical to recover permeate from the solution. The rejected material is called brine or the reject. Typically, about 50% of recovery of permeate from the original volume of sea water solution reaches a practical recovery limit.

Referring now to FIG. 1, a reverse osmosis system 10 is illustrated having a membrane array 12 that generates a permeate stream 14 and a brine stream 16 from a feed stream 18. The feed stream 18 typically includes brackish or sea water. A feed pump 20 coupled to a motor 22 pressurizes the feed stream 18 to the required pressure flow which enters the membrane array 12.

The permeate stream 14 is purified fluid flow at a low pressure. The brine stream 16 is a higher pressure stream that contains dissolved materials blocked by the membrane. The pressure of the brine stream 16 is only slightly lower than the feed stream 18. The membrane array 12 requires an exact flow rate for optimal operation. A brine throttle valve 30 may be used to regulate the flow through the membrane array 12. Changes take place due to water temperature, salinity, as well as membrane characteristics, such as fouling. The membrane array 12 may also be operated at off-design conditions on an emergency basis. The feed pumping system is required to meet variable flow and pressure requirements.

In general, a higher feed pressure increases permeate production and, conversely, a reduced feed pressure reduces permeate production. The membrane array 12 is required to maintain a specific recovery which is the ratio of the permeate flow to feed flow. The feed flow or brine flow likewise requires regulation.

A pretreatment system 21 may also be provided to pre-treat the fluid into the membrane array 12. The pretreatment system 21 may be used to remove solid materials such as sand, grit and suspended materials. Each of the embodiments below including those in the detailed disclosure may include a pretreatment system 21.

Referring now to FIG. 2, a system similar to that in FIG. 1 is illustrated with the addition of a feed throttle valve 30. Medium and large reverse osmosis plants typically include centrifugal-type pumps 20. The pumps have a relatively low cost and good efficiency, but they may generate a fixed pressure differential at a given flow rate and speed of rotation. One way prior systems were designed was to size the feed pump 20 to generate the highest possible membrane pressure and then use the throttle valve 30 to reduce the excess pressure to meet the membrane pressure requirement. Such a system has a low capital cost advantage but sacrifices energy efficiency since the feed pump generates more pressure and uses more power than is required for a typical operation.

Referring now to FIG. 3, another system for solving the pressure/flow characteristics is to add a variable frequency drive 36 to operate the motor 22 which, in turn, controls the operation of the feed pump 20. Thus, the feed pump 20 is operated at variable speed to match the membrane pressure requirement. The variable frequency drives 36 are expensive with large capacities and consume about three percent of the power that would otherwise have gone to the pump motor.

Referring now to FIG. 4, a system similar to that illustrated in FIG. 1 is illustrated using the same reference numerals. In this embodiment, a hydraulic pressure booster 40 having a pump portion 42 and a turbine portion 44 is used to recover energy from the brine stream 16. The pump portion 42 and the turbine portion 44 are coupled together with a common shaft 46. High pressure from the brine stream passes through the turbine portion 44 which causes the shaft 46 to rotate and drive the pump portion 42. The pump portion 42 raises the feed pressure in the feed stream 18. This increases the energy efficiency of the system. The booster 40 generates a portion of the feed pressure requirement for the membrane array 12 and, thus, the feed pump 20 and motor 22 may be reduced in size since a reduced amount of pressure is required by them.

Referring now to FIG. 5, a membrane element 60 that is suitable for positioning within a membrane array 12 of one of the previous Figs. is illustrated. The element 60 includes leaves of membrane material wrapped into a spiral configuration and placed in a thin tube 62 of material such as fiberglass. Each membrane leaf includes two membrane sheets glued on three sides with the fourth side attached to a central permeate pipe 64. Spacer grids (not shown) keep the membrane sheet from collapsing under the applied pressure. Feed solution enters one end of the membrane array 60 in the direction indicated by arrows 66. The solution or feed flows axially along the membrane element 60 and between the leaves 68 and exits through the high pressure brine outlet as indicated by arrows 70. Permeate is collected from the leaves 68 through permeate pipe 64. The pressure of the permeate through the tube 64 is essentially zero since the applied pressure is used to overcome the osmotic pressure and frictional losses of the flow of feed material through the membrane.

Referring now to FIG. 6, a pressure vessel 78 that includes a plurality of membrane elements referred to collectively with reference numeral 60 is illustrated. In this example, three membrane elements are disposed within the pressure vessel 78. Each is denoted by a numerical and alphabetical identifier. In this example, three membrane elements 60a, 60b and 60c are provided in the pressure vessel 78. The pressure vessel 78 includes a first end cap 80 at the input end and a second end cap 82 at the outlet end. Feed is introduced into the pressure vessel in the direction of the arrows 84.

In this example, the three membrane elements 60a-60c are placed in series. Each subsequent element extracts a smaller amount of permeate than the preceding element due to an increasing osmotic pressure and decreasing applied pressure caused by frictional losses within the membrane elements. As a consequence, the final element 60c may produce very little permeate. The permeate pipe 64 collects permeate from each of the membrane elements 60a-60c.

A typical reverse osmosis system operates at a constant pressure that is developed at the feed pump 20. The result is that an excess of applied pressure at the first membrane array may result in an undesirably high rate of permeate extraction which may allow the membranes to be damaged. The final membrane element 60c may have an undesirably low rate of extraction which may result in permeate with an excessive amount of salt contamination.

Referring now to FIG. 7, a manually operated reverse osmosis system 100 is illustrated. A reservoir 102 may be filled with seawater or other brine solution. A manually operated pump 104 having a lever 106 draws feed from the reservoir 102. The pump 104 raises the pressure of the feed and provides the pressurized feed to a pressure vessel 108 having a membrane 110 therein. Permeate produced through the membrane exits the pressure vessel 108 through a permeate pipe 112. Brine, under high pressure, leads the pressure vessel 108 through a brine pipe 114. A control valve 116 is used to reduce the pressure of the high-pressure brine stream in the brine pipe 114. Once the pressure is reduced in the brine stream through the pressure-reducing valve 116, the brine stream enters a drain 118.

A control valve 122 may be used to control adjust the feed pressure and flow required for proper operation of the membrane 110.

Referring now to FIG. 8, another embodiment of a manually operated reverse osmosis system 100' is illustrated. Many of the components are similar to those set forth in FIG. 7 and thus are provided the same reference numerals. In this embodiment, an energy recovery device 140 is used in the brine stream. The energy recovery device 140 receives the brine from the high-pressure brine pipe 114. The energy recovery device 140 has a recirculation device such as a piston assembly 138 that includes a brine piston 142 that is connected to a feed piston 144 with a connecting rod 146. The brine piston 142 may have a larger diameter than the feed piston 144 to accommodate pressure losses that occur in the membrane 110 and the interconnecting piping.

The energy recovery device receives feed through a feed pipe 150 which is in fluid communication with the fluid reservoir 102. Fluid enters the energy recovery device 140 through a one-way valve 152. Under pressure from within the energy recovery device 140, the valve 152 closes.

The energy recovery device 140 has an outlet feed pipe 154 that is in fluid communication with the energy recovery device 140 through a valve 156. The valve 156 may also be a one-way valve. The valve 156 operates in the opposite direction than that of valve 152. For example, when the pressure in the feed line 150 is higher than the pressure within a chamber 160, adjacent to the piston 144, feed fluid is input into the chamber 160. When pressure is high within the chamber 160, the valve 152 closes and valve 156 opens and provides a higher-pressure feed into the pressure vessel 108. Valve-timing equipment 164 admits high-pressure brine to the energy recovery device 140 resulting in movement of the brine piston 142 which causes the feed piston 144 to increase the pressure of the feed into the high-pressure feed manifold 166. A shaft seal 168 seals the connecting rod 146 to prevent losses between the high-pressure side and the low-pressure side of the energy recovery device 140. When the pumping stroke is complete, the piston assembly is moved in the opposite direction so that new feed is admitted into the chamber 140 through the valve 142. This causes the brine to be ejected through the drain 118. A motor or other actuator may be used to move the piston in the reverse direction. The actuator has not been shown to simplify the drawing. The energy recovery device 140 only pressurized a feed flow equal to the permeate flow. This eliminates work otherwise needed to pressurize the flow that will be rejected as high-pressure brine.

The embodiments of FIGS. 7 and 8 may also be provided with a multiple membrane element pressure vessel as described in FIG. 4.

One aspect of prior reverse osmosis systems is that the process operates at a constant pressure developed by the feed pump. Examples of this are illustrated in FIGS. 1-4. The result of a constant pressure feed pump is that excess pressure is applied at the beginning of the membrane array where the osmotic pressure is relatively low. This may result in an undesirably high rate of permeate extraction which can damage the membranes. On the other hand, the final membrane element where the osmotic pressure is high may have an undesirably low rate of extraction which may result in a permeate with an excessive amount of sale contamination.

SUMMARY

The present disclosure provides a reverse osmosis system that allows the pressure at the membrane to be varied during the batch process. By varying the pressure energy wasting excessive pressures can be avoided, as well, a high enough pressure for good quality permeate may be maintained.

In one aspect of the disclosure, a batch reverse osmosis system in fluid communication with a fluid reservoir includes a first housing having an inlet valve in fluid communication with the fluid reservoir. The system also includes a pressure vessel having an elongated liner with a first end and a second end, a membrane disposed within the second end having a membrane inlet, a membrane outlet disposed at the second end and a permeate outlet. The system also includes a recirculation piston disposed within the first end of the elongated liner. The recirculation piston defines a fluid volume between the recirculation piston and the membrane adjacent to the membrane inlet. The system includes a plunger disposed within the housing and an actuator. The housing and the plunger define a chamber. The plunger is coupled to the actuator. The system further includes a hollow pipe coupled to the actuator, whereby the plunger, the hollow pipe and the piston move in response to the actuator. The hollow pipe has a port. The hollow pipe communicates fluid between the chamber within the housing and the fluid volume within the pressure vessel.

In a further aspect of the disclosure, a method of operating a reverse osmosis system having an elongated pressure vessel having a first end, a second end and an outer wall, a permeate output and a brine output includes forming an annular space between a liner and the outer wall. The method further includes positioning a membrane within the liner opposite the first end of the pressure vessel. The membrane has a first face and a second face. The method also includes forming a fluid volume between the first face of the membrane and a piston, actuating a plunger in a chamber in a first direction, communicating fluid into a chamber in response to actuating the plunger in the first direction, actuating the plunger in a second direction, communicating fluid from the chamber into the fluid volume, passing brine fluid through the membrane, recirculating brine fluid from the second face of the membrane toward the first end of the pressure vessel through the annular chamber, producing permeate through the membrane and communicating the permeate from the pressure vessel.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
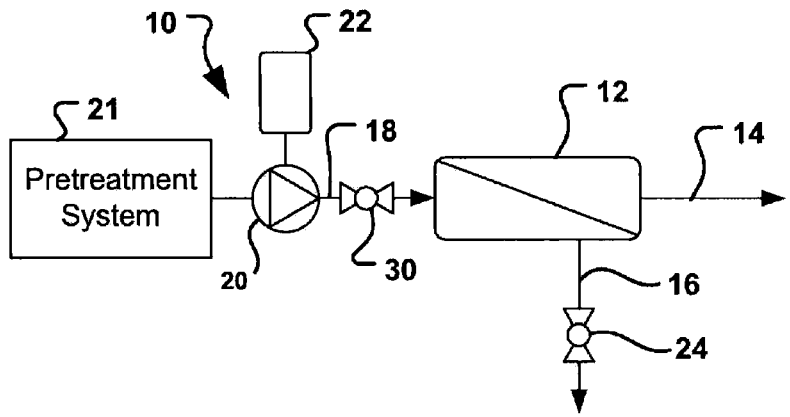
FIG. 1 is a schematic view of a prior reverse osmosis system.
Figure 2:
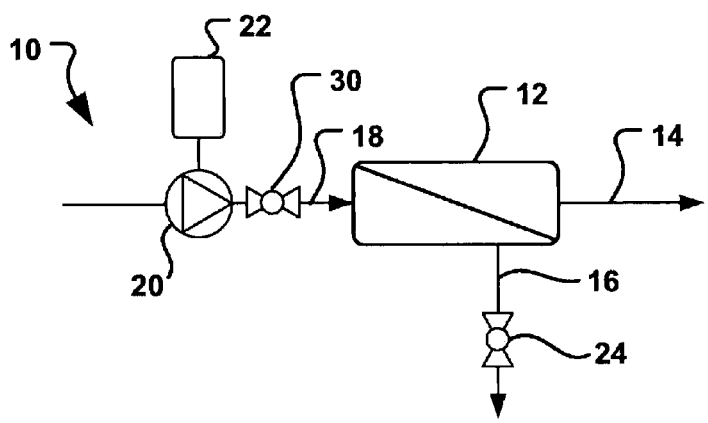
FIG. 2 is a schematic view of an alternate prior art reverse osmosis system.
Figure 3:
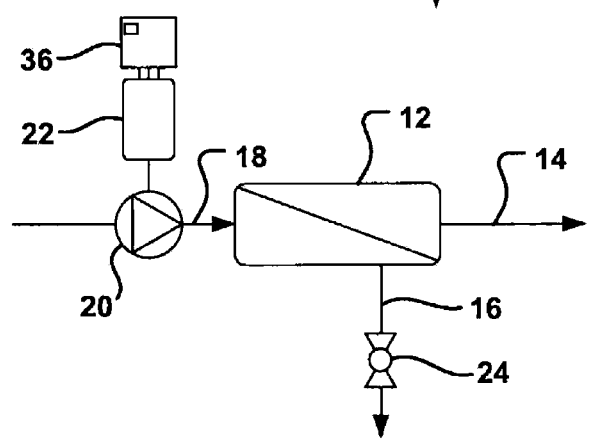
FIG. 3 is a schematic view of another prior art of a reverse osmosis system.
Figure 4:
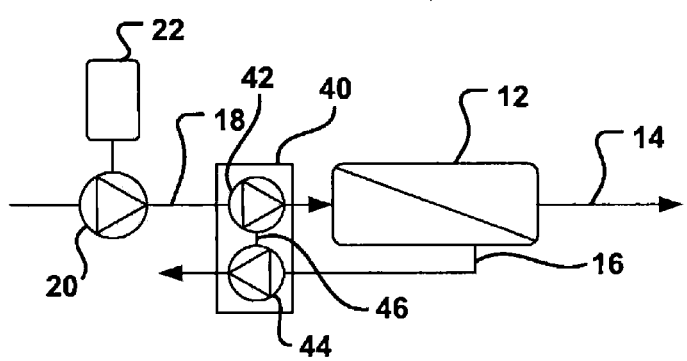
FIG. 4 is another schematic view of a prior art configuration of a reverse osmosis system.
Figure 5:
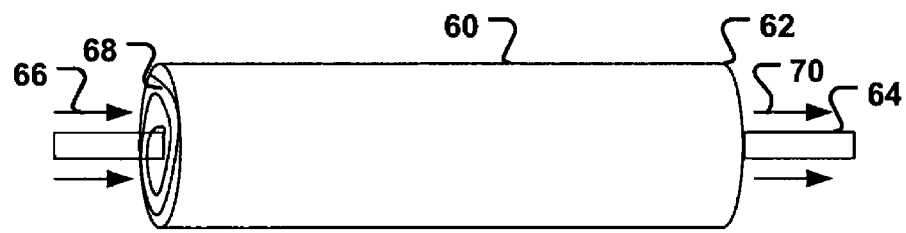
FIG. 5 is a perspective view of a prior art membrane elements according to the prior art.
Figure 6:
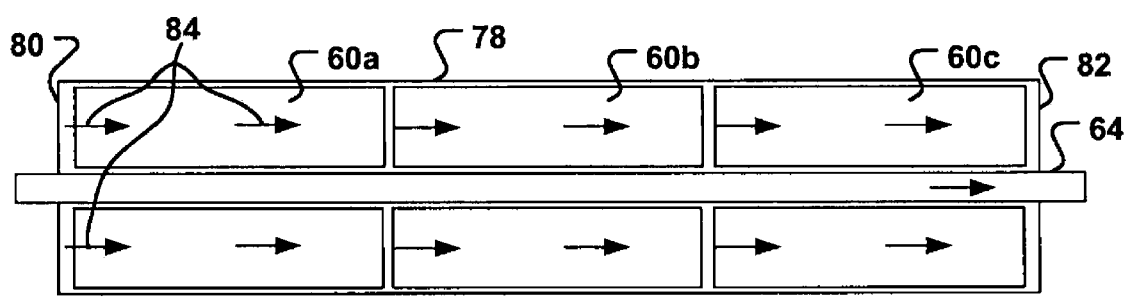
FIG. 6 is a cross-sectional view of a pressure vessel having a plurality of membrane elements such as those illustrated in FIG. 4 according to the prior art.
Figure 7:
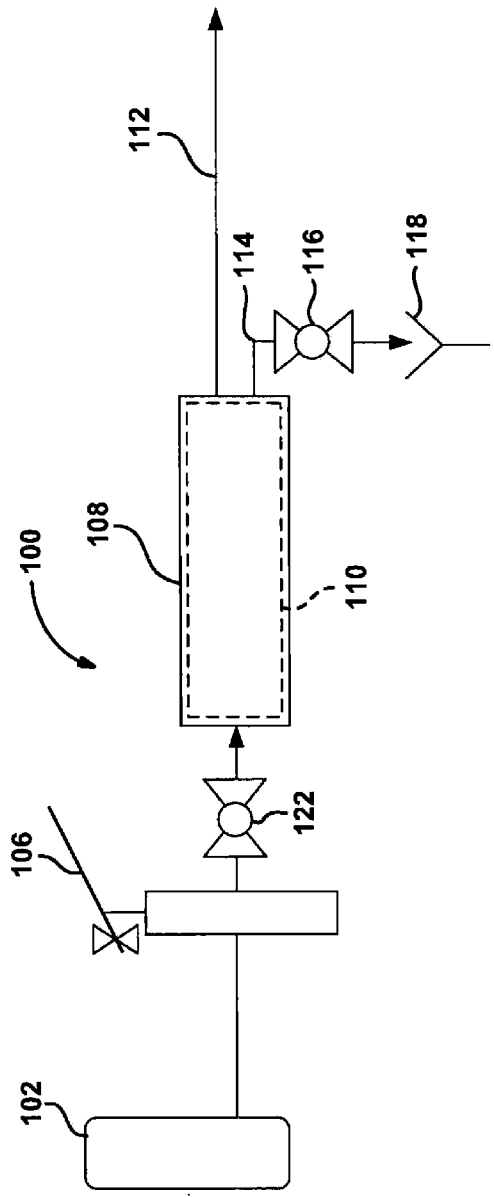
FIG. 7 is a schematic view of a manual batch process reverse osmosis system.
Figure 8:
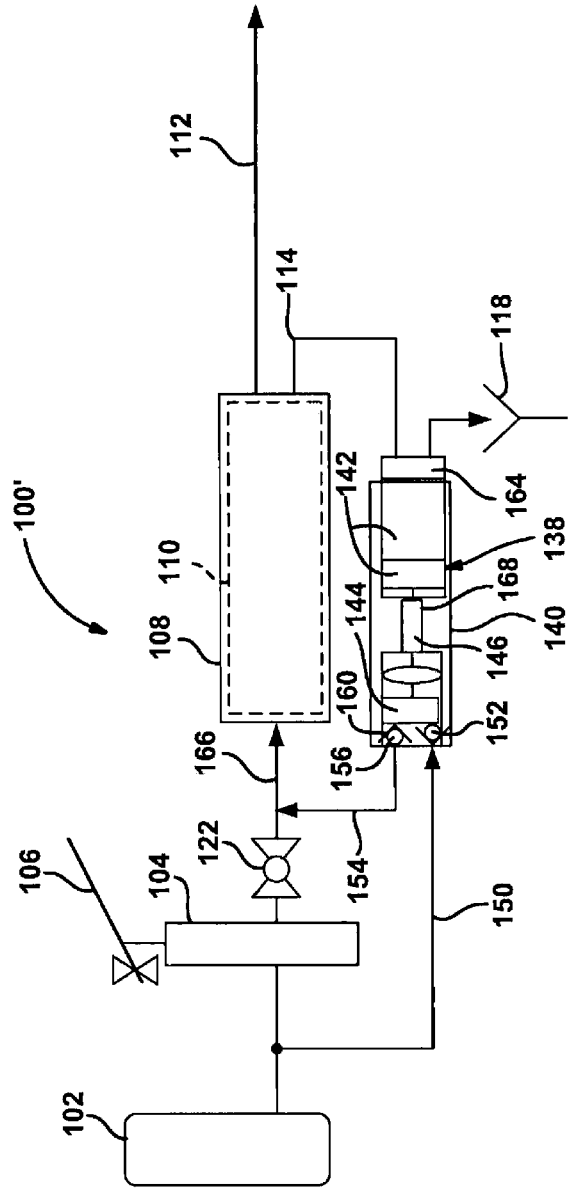
FIG. 8 is a schematic view of a second batch operated reverse osmosis system having a piston energy recovery device.

The following description is merely exemplary in nature and is not intended to limit the present disclosure, application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

In the following disclosure, a batch process in which applied pressure is varied as needed to maintain permeate production at a desired rate as the osmotic pressure increases is set forth. Various parameters and operating conditions may vary depending on various characteristics including the type of membrane. As mentioned above, operation of the system at a pressure that does not waste energy by being too high or that is too low for good quality permeate is desired.

Figure 9:
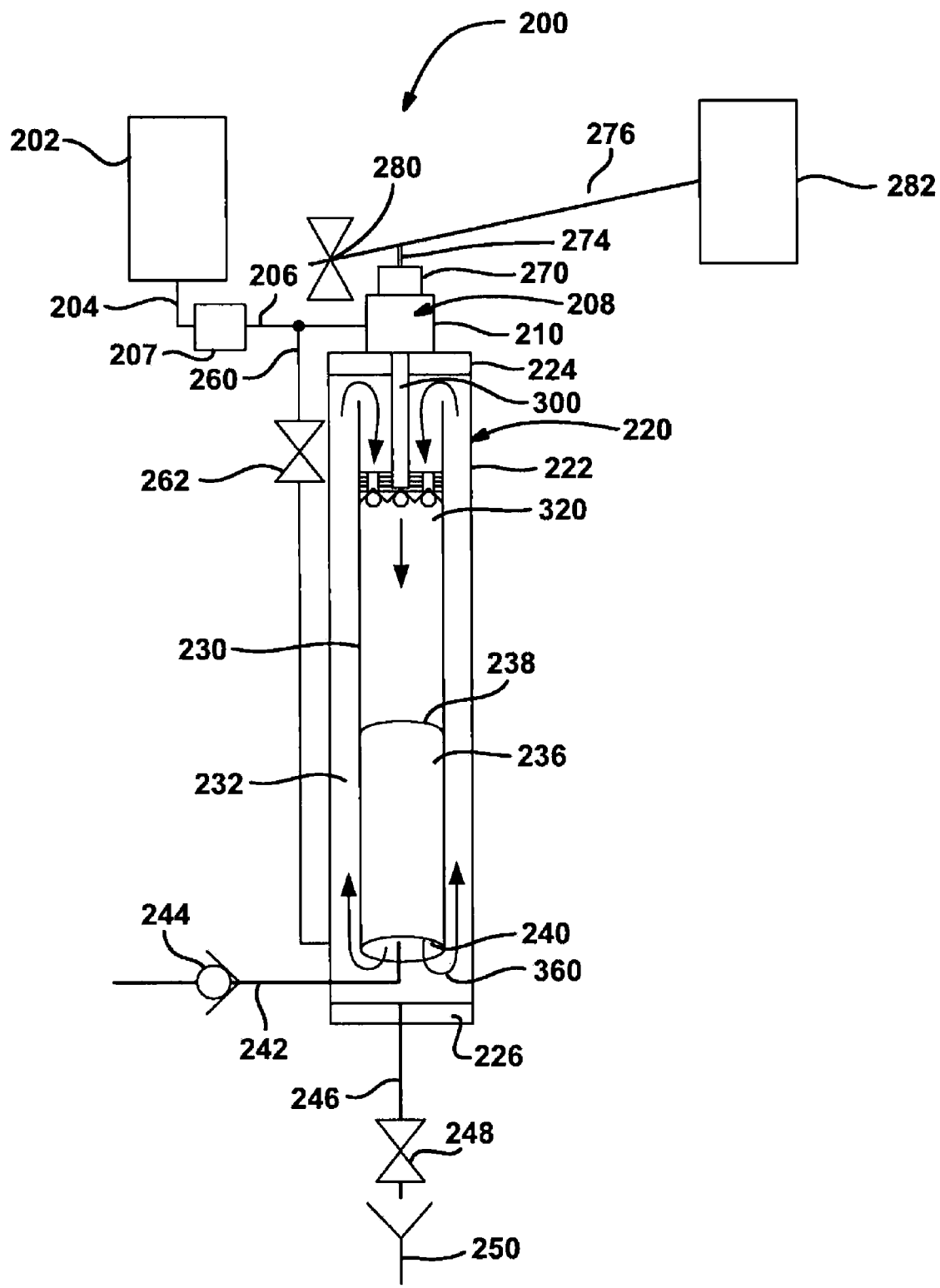
FIG. 9 is a schematic view embodiment of a batch process reverse osmosis system according to the present disclosure.
Figure 10:
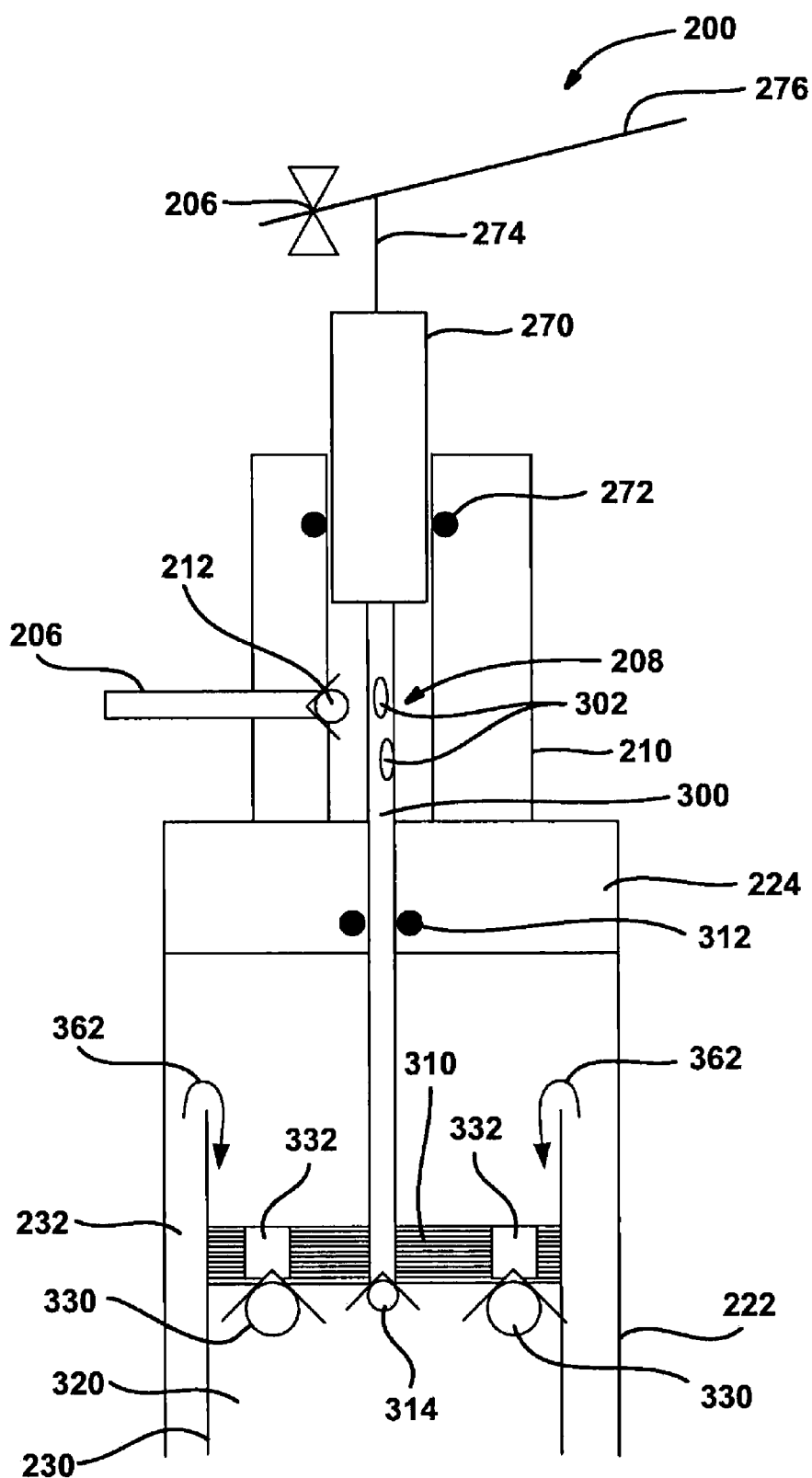
FIG. 10 is a schematic view of an enlarged top portion of the batch process reverse osmosis system of FIG. 9.

Referring now to FIGS. 9 and 10, a reverse osmosis system 200 that uses a batch process in which the applied pressure is varied as required to maintain permeate production at a desired rate as the osmotic pressure increases is set forth. As mentioned above, the reverse osmosis system 200 includes a fluid reservoir 202 that provides feed fluid 204 through a feed pipe 206 and a filter 207 to a chamber 208 within a housing 210. The feed fluid provided through the feed pipe 206 is provided through a one-way valve 212. When the pressure in the feed pipe 206 is higher than that in the chamber 208, the one-way valve 212 opens allowing the chamber 208 to be filled with feed fluid.

The reverse osmosis system 200 includes a pressure vessel 220 having an outer wall 222, a first end cap 224 and a second end cap 226. The pressure vessel 220 in this example is cylindrical and elongated in shape. The pressure vessel 220 has a liner 230 disposed therein. The liner may also be elongated. The liner 230 may be disposed so that an annular passage 232 is provided between the liner and the outer wall 222. By providing the passage 232, fluid may pass between the outer wall 220 and the liner. The fluid passage 232, in the case of a cylindrical liner or tubular liner and cylindrical outer wall, is an annular space.

A membrane 236 having an input end 238 and an outlet end 240 is disposed within the liner 230. The outlet end 240 provides higher concentration brine ultimately into the annular space 232 for recirculation within the pressure vessel 220. The membrane is disposed in the liner opposite to where pressurized fluid is introduced into the pressure vessel 220. A permeate pipe 242 communicates permeate fluid 242 from the membrane 236 out of the pressure vessel 220. A permeate outlet valve 244 is a one-way valve that allows permeate fluid to leave the pressure vessel 220 but prevent backflow. A drain pipe 246 and a drain valve 248 cause brine fluid from within the pressure vessel 220 to be drained into a drain 250 when the drain valve 248 is opened.

A fill pipe 260 having a fill valve 262 is used to provide feed fluid into the pressure vessel 222 prior to starting the permeate producing process.

Details of the housing 210 are illustrated in further detail. The housing 210 and outer wall 222 of the pressure vessel 220 may be integrally formed with the end cap 224 or a wall therebetween. The housing 210 may also be spaced apart from pressure vessel 220.

A plunger 270 is movably disposed within the housing 210. A seal 272 prevents fluid leaks from the chamber 208 outside of the housing 210. The plunger 270 moves in a linear direction in response to the movement of the rod 274. The rod 247 is attached to a lever 276 which in turn moves about a fulcrum 280. The lever 276 may be manually operated or may be operated through the use of an actuator 282. Of course, various movement mechanisms would be evident to those skilled in the art. What is important in the movement of the plunger 270 is that the plunger moves in a linear motion. As is illustrated, the plunger 270 moves in a linear motion on or parallel with the elongated axis of the housing 210 and the pressure vessel 224.

The plunger 270 may be mechanically coupled to a hollow pipe 300 so that movement of the plunger causes movement of the pipe 300. The hollow pipe 300 may include ports 302 for receiving fluid from within the chamber 208 and communicating the fluid into the pipe 300. The pipe 300 may extend through the chamber 208 through the first end cap 224 and through a recirculation piston 310. The pipe 300 may be sealed within the end cap 312 to prevent fluid from within the pressure vessel 222 from entering the chamber 208.

The hollow pipe 300 may include an outlet valve 314. The outlet valve 314 is a one-way valve used to allow pressurized fluid from the chamber 208 to enter the lower pressure fluid volume 320 when conditions are such. The outlet valve 314 may be disposed in various locations including within the fluid volume 320 at the end of the hollow pipe or within the hollow pipe 300.

The piston may be mechanically coupled to the pipe 300. That is, movement of the pipe 300 caused by movement of the plunger 270 causes the piston to move in a corresponding direction and amount.

The fluid volume 320 is defined by the space between the bottom of the piston 310, the liner 230 and the first end 238 of the membrane 236. The fluid volume 320 may be about one to about two times a volume of the membrane 236.

The recirculation piston 310 includes one or more check valves 330 in passages 332 through the piston that permit flow from the annular passage 232 to ultimately enter the fluid volume 320. The check valves 330 may be one-way valves that prevent the movement of fluid from within the fluid volume 320 column back into the annular passage 232.

In operation, an upward movement of the lever 276 causes an upward movement in the rod 274. Movement of the rod 274 moves the plunger 270 and the hollow pipe 300 also in an upward direction. As the plunger 270 moves in an upward direction, the chamber 208 has a volume that increases and a pressure that decreases which cause the valve 212 to open and fill the chamber 208. Prior to the upward movement of the actuator, it is presumed that the pressure vessel 220 has been drained of brine and that the pressure vessel 262 has been filled with feed fluid from the fluid reservoir.

A downward movement of the lever 262 causes the rod 274 and plunger 270 to move in a downward direction. Likewise, the pipe 300 and piston 310 also move in a downward direction. The downward moving plunger 270 increases the fluid pressure within the chamber 208 and causes the check valve 314 to open. The downward moving plunger 270 creates a high pressure within the fluid volume 320 and causes permeate production through the permeate pipe 242. Excess brine created from the feed fluid moves out of the second end 240 of the membrane 236 and through the annular chamber in an upward direction as illustrated by arrows 360 in response to the downward movement of recirculation piston 310. Ultimately the brine recirculates through the annular chamber 232 to the first end of the pressure vessel 222 as indicated by arrows 362. During the downward motion, valves 330 remains closed thereby driving the aforementioned circulation. The pressure in the pressure vessel 222 during downward movement increases to a pressure sufficient to cause the membrane 236 to generate a volume of permeate equal to the amount of water entering the pressure vessel 222 due to the incompressibility of water. The amount of permeate that exits the permeate pipe 242 equals the amount of feed water pumped into the pressure vessel 222 through the pumping action of the plunger 270. The drain valve 248 remains closed.

As can be seen, since the brine is not depressurized as it is stored in the pressure vessel 222, no means are needed to provide hydraulic energy recovery and thus the system is less complex, less expensive and more reliable than providing an energy recovery device.

Upward movement of the recirculation piston 310 and plunger 270 stops the recirculation movement as valves 330 open and no additional feed water is provided through the hollow pipe 300. Permeate productions stops.

The salinity of the solution within the pressure vessel 222 increases as permeate is produced. At some point, the production of additional permeate is no longer practical. Therefore, the brine in the pressure vessel 222 is replaced by a new batch of feed water. As mentioned above, the brine solution is removed through the drain pipe 246 through drain valve 248 and into a drain 250. Gravity may cause the pressure vessel 220 to drain. Actuation of the lever 276 may facilitate the process of draining the brine from the pressure vessel 222. The permeate check valve 244 minimizes the reverse flow of permeate into the membrane when the pressure vessel is reduced to below the osmotic pressure during the brine-draining cycle. Simultaneously with brine draining, the fill valve 262 may be opened to allow new feed fluid to displace the brine. By action the lever arm 276 in an upward direction, the feed enters the annular space 232 and moves in an upward direction to help displace the brine. When the brine has been replaced by the feed water, the valves 248 and 262 are closed. Thereafter, the process is complete and a new batch of permeate may again be formed as described above.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A batch reverse osmosis system in fluid communication with a fluid reservoir comprising:
    a pressure vessel having an elongated liner with a first end and a second end, a membrane disposed within the second end having a membrane inlet, a membrane outlet disposed at the second end and a permeate outlet wherein the liner and the pressure vessel have fluid clearance therebetween whereby brine fluid from the membrane recirculates to the first end through the fluid clearance;
    a recirculation piston disposed proximate the first end, said recirculation piston defining a fluid volume between the recirculation piston and the membrane adjacent to the membrane inlet;
    a plunger disposed within a housing that is coupled to the pressure vessel, said housing and said plunger defining a chamber, said plunger coupled to an actuator;
    said housing having a first one-way inlet valve in fluid communication with the fluid reservoir; and
    a hollow pipe coupled to the actuator, whereby the plunger, the hollow pipe and the piston move in response to the actuator, said hollow pipe having a port, said hollow pipe communicating fluid between said chamber within the housing and said fluid volume within the pressure vessel.

2. A batch reverse osmosis system as recited in claim 1 further comprising a filter filtering fluid from the fluid reservoir.

3. A batch reverse osmosis system as recited in claim 1 wherein the permeate outlet comprises a permeate one-way valve.

4. A batch reverse osmosis system as recited in claim 1 wherein the hollow pipe extends through a first end cap of the pressure vessel and a seal fluidically seals the hollow pipe to the first end cap.

5. A batch reverse osmosis system as recited in claim 1 wherein the hollow pipe has an outlet valve communicating fluid from the hollow pipe to the fluid volume.

6. A batch reverse osmosis system as recited in claim 5 wherein the outlet valve comprises a one-way valve.

7. A batch reverse osmosis system as recited in claim 5 wherein the outlet valve is disposed adjacent to the piston.

8. A batch reverse osmosis system as recited in claim 5 wherein the outlet valve is disposed within the fluid volume.

9. A batch reverse osmosis system as recited in claim 1 wherein the liner and the pressure vessel have a fluid clearance therebetween whereby brine fluid from the membrane recirculates to the first end through the fluid clearance.

10. A batch reverse osmosis system as recited in claim 1 wherein the recirculation device comprises a check valve communicating fluid from the fluid clearance to the fluid volume.

11. A batch reverse osmosis system as recited in claim 1 wherein the pressure vessel has a drain pipe and drain valve.

12. A batch reverse osmosis system as recited in claim 1 wherein the pressure vessel has a fill pipe and a fill valve communicating fluid from the fluid reservoir to the pressure vessel.

13. A batch reverse osmosis system as recited in claim 1 wherein the fluid volume is about 1 to about 2 times a membrane volume.

14. A method of operating a reverse osmosis system having an elongated pressure vessel having a first end, a second end and an outer wall, a permeate output, a brine output, an annular space between a liner and the outer wall, a membrane within the liner opposite the first end of the pressure vessel, said membrane having a first face and a second face, a fluid volume between the first face of the membrane and a recirculation device, a housing having a plunger, a hollow pipe in fluid communication with the fluid volume and a one-way valve, said method comprising:

actuating the recirculation device in a chamber in a first direction by moving the plunger, the hollow pipe and the piston;

communicating fluid into the chamber through a one-way valve in the housing in response to actuating the plunger in the first direction;

actuating the plunger in a second direction;

communicating fluid from the chamber into the fluid volume through the hollow pipe;

passing brine fluid through the membrane;

recirculating brine fluid within the pressure vessel from the second face of the membrane toward the first end of the pressure vessel through the annular chamber;

producing permeate through the membrane; and communicating the permeate from the pressure vessel.

15. A method as recited in claim 14 wherein prior to actuating a plunger in a first direction, filing the pressure vessel from a fluid reservoir.

16. A method as recited in claim 14 wherein communicating fluid into a chamber comprises communicating fluid into the chamber through a filter.

17. A method as recited in claim 14 wherein communicating fluid from the chamber into the fluid volume comprises communicating fluid from the fluid chamber into the fluid volume through a port in hollow pipe.

18. A method as recited in claim 14 wherein communicating fluid from the chamber into the fluid volume comprises communicating fluid from the fluid chamber into the fluid volume through a hollow pipe mechanically coupled between the plunger and the recirculation device.

19. A method as recited in claim 14 wherein communicating fluid from the chamber into the fluid volume comprises communicating fluid from the fluid chamber into the fluid volume through a hollow pipe having a one-way valve disposed therein.

20. A method as recited in claim 14 further comprising draining the pressure vessel though a drain valve.

* * * * *